(12) United States Patent
Vaccaro (10) Patent No.: US 10,817,041 B2
(45) Date of Patent: Oct. 27, 2020

(54) ENERGY EFFICIENT COMPUTER PROCESS

(71) Applicant: Philip Vaccaro, Knoxville, TN (US)

(72) Inventor: Philip Vaccaro, Knoxville, TN (US)

(*) Notice: Subject to any disclaimer, the term of this patent is extended or adjusted under 35 U.S.C. 154(b) by 108 days.

(21) Appl. No.: 16/166,466

(22) Filed: Oct. 22, 2018

(65) Prior Publication Data

US 2019/0155363 A1 May 23, 2019

Related U.S. Application Data

(60) Provisional application No. 62/587,720, filed on Nov. 17, 2017.

(51) Int. Cl.
*G06F 1/3206* (2019.01)
*G06F 1/3234* (2019.01)
*G06F 1/3203* (2019.01)

(52) U.S. Cl.
CPC .......... *G06F 1/3206* (2013.01); *G06F 1/3203* (2013.01); *G06F 1/3234* (2013.01); *G06F 1/3275* (2013.01)

(58) Field of Classification Search
CPC ...... G06F 1/3203; G06F 1/326; G06F 1/3234; G06F 1/3275
See application file for complete search history.

(56) References Cited

U.S. PATENT DOCUMENTS

| | | | |
|---|---|---|---|
| 3,736,569 A | 5/1973 | Bouricius | |
| 5,784,628 A | 7/1998 | Reneris | |
| 5,944,831 A | 8/1999 | Pate | |
| 6,748,547 B1 | 6/2004 | Inoue | |
| 6,782,484 B2 | 8/2004 | McGowan | |
| 7,272,732 B2 | 9/2007 | Farkas | |
| 8,706,652 B2 | 4/2014 | Yang | |
| 8,862,914 B2* | 10/2014 | Kansal | G06F 11/3447 713/320 |
| 9,213,380 B2 | 12/2015 | Bandholz | |
| 9,451,038 B2 | 9/2016 | Beadle | |
| 2003/0135766 A1 | 7/2003 | Zyskowski | |
| 2004/0044914 A1 | 3/2004 | Gedeon | |
| 2006/0282656 A1 | 12/2006 | Chang | |
| 2007/0300083 A1* | 12/2007 | Goodrum | G06F 1/3203 713/300 |
| 2010/0146316 A1* | 6/2010 | Carter | G06F 1/3203 713/322 |

(Continued)

*Primary Examiner* — Glenn A. Auve
(74) *Attorney, Agent, or Firm* — Pitts & Lake, PC (57) ABSTRACT

Described is a process for optimizing energy utilization in a computer processing device, including sampling energy and power measurements for given hardware components, storing the energy and power measurements, computing metrics for a sample based on current power consumption and current power limits, comparing the current sample metrics against a metric threshold, classifying the current sample based on the comparison, assigning a classification type based on the classifying the current sample, determining if an actual number of a computational intensity characteristic exceeds a maximum allowed reference number in a sample window for the classification type, if the actual number of a computational intensity characteristic exceeds the maximum for the classification type, computing a new maximum allowed for the classification type, and constraining the hardware components to the new maximum energy and power measurements.

14 Claims, 10 Drawing Sheets

(56) References Cited

U.S. PATENT DOCUMENTS

| | | | |
|---|---|---|---|
| 2012/0167109 A1* | 6/2012 | Muralidhar | G06F 9/5094 718/103 |
| 2016/0054784 A1 | 2/2016 | Decesaris | |
| 2017/0192479 A1* | 7/2017 | Lee | G06F 1/28 |
| 2017/0205866 A1* | 7/2017 | Dhanyamraju | G06F 1/3296 |
| 2018/0032418 A1* | 2/2018 | Wang | G06F 1/3206 |
| 2018/0210530 A1* | 7/2018 | Kwon | G06F 1/3206 |
| 2018/0307288 A1* | 10/2018 | Huang | G06F 1/3203 |
| 2019/0102233 A1* | 4/2019 | Santambrogio | G06F 9/5094 |
| 2019/0370085 A1* | 12/2019 | Gross | G06F 1/3296 |

* cited by examiner

ENERGY EFFICIENT COMPUTER PROCESS

CROSS-REFERENCE TO RELATED APPLICATIONS

This application claims the benefit of U.S. Provisional Patent Application No. 62/587,720, filed on Nov. 17, 2017

BACKGROUND

As the speed and capacity of computer systems has evolved dramatically over the last several years, so has the energy demands of these systems. At the present time, computer systems in the range of a least one exaFLOP, or a billion billion calculations per seconds are being developed. This is known as exascale computing and is thought to be in the range of the processing power of the human brain. Additionally, the software applications that run on these computers have also gotten larger and more complex, further increasing the energy needs of the system. Thus, there exists a need to reduce the amount of energy consumed by the computer system while running the software applications, but without compromising performance requirements.

Modern computer architectures provide means for accessing energy counters that provide information regarding the system's energy usage. Software interfaces allow users to collect power measurements from the counters. By sampling these energy metrics over time, a power profile of a software application can be created and can provide information about the software application, such as whether certain operations are memory intensive (memory-bound) or processor intensive (compute-bound). For example, the Intel RAPL driver exposes counters such as CPU package and DRAM energy. Intel Powercap provides an abstraction layer on top of RAPL and provides an interface for measuring and managing power. The relevant energy system files are readable by any user, while a user only needs write permission for a few files in order to set system power limits.

Prior art methods of reducing energy consumption in computer systems have focused on classifying software applications as energy efficient or "green," and by making modifications to the software applications so that they are more efficient and thus require less power consumption by the computer hardware devices. Such an approach, however, requires a significant expenditure of time and energy, and would be difficult to make modifications during run time. Thus, it would be beneficial to have an energy efficient computer process that analyzes and categorizes software applications on the fly, while at the same time, uses the results of the analysis to cap power consumption from the hardware devices, using currently available power-management software components.

BRIEF SUMMARY

Example embodiments of the present general inventive concept provide a process for optimizing energy utilization in a computer processing device, the method comprising sampling energy and power measurements for given hardware components at a regular interval, storing the energy and power measurements for later analysis, computing metrics for a software sample based on current power consumption and current power limits for given system hardware components, comparing the current software sample metrics against a metric threshold, classifying the current software sample based on the comparison of the current software sample metrics against a metric threshold, assigning a classification type based on the classifying the current software sample, determining if an actual number of a computational intensity characteristic exceeds a maximum allowed reference number in a sample window for the classification type, if the actual number of a computational intensity characteristic exceeds the maximum for the classification type, computing a new maximum allowed for the classification type, and constraining the hardware components to the new maximum energy and power measurements

BRIEF DESCRIPTION OF THE FIGURES

The following example embodiments are representative of exemplary techniques and structures designed to carry out the objectives of the present general inventive concept, but the present general inventive concept is not limited to these example embodiments. A wide variety of additional embodiments will be more readily understood and appreciated through the following detailed description of the exemplary embodiments, with reference to the accompanying drawings in which.

DETAILED DESCRIPTION

A process is described for optimizing energy utilization in a computer processing device, the method comprising sampling energy and power measurements for given hardware components at a regular interval, storing the energy and power measurements for later analysis, computing metrics for a sample based on current power consumption and current power limits for given system hardware components, comparing the current sample metrics against a metric threshold, classifying the current sample based on the comparison of the current software sample metrics against a metric threshold, assigning a classification type based on the classifying the current sample, determining if an actual number of a computational intensity characteristic exceeds a maximum allowed reference number in a sample window for the classification type, if the actual number of a computational intensity characteristic exceeds the maximum for the classification type, computing a new maximum allowed for the classification type, and constraining the hardware components to the new maximum energy and power measurements.

In a further embodiment, a process is described for optimizing energy utilization in a computer processing device, the method comprising sampling energy and power measurements and hardware counters for given hardware components at a regular interval, storing the energy and power measurements for later analysis, computing metrics for a sample based on current power consumption, current power limits and hardware counters for given system hardware components, comparing the current sample metrics against a metric threshold, classifying the current sample based on the comparison of the current sample metrics against a metric threshold, assigning a classification type based on the classifying the current sample, determining if an actual number of a computational intensity characteristic exceeds a maximum allowed reference number in a sample window for the classification type, if the actual number of a computational intensity characteristic exceeds the maximum for the classification type, computing a new maximum allowed for the classification type, and constraining the hardware components to the new maximum energy and power measurements.

Figure 1:
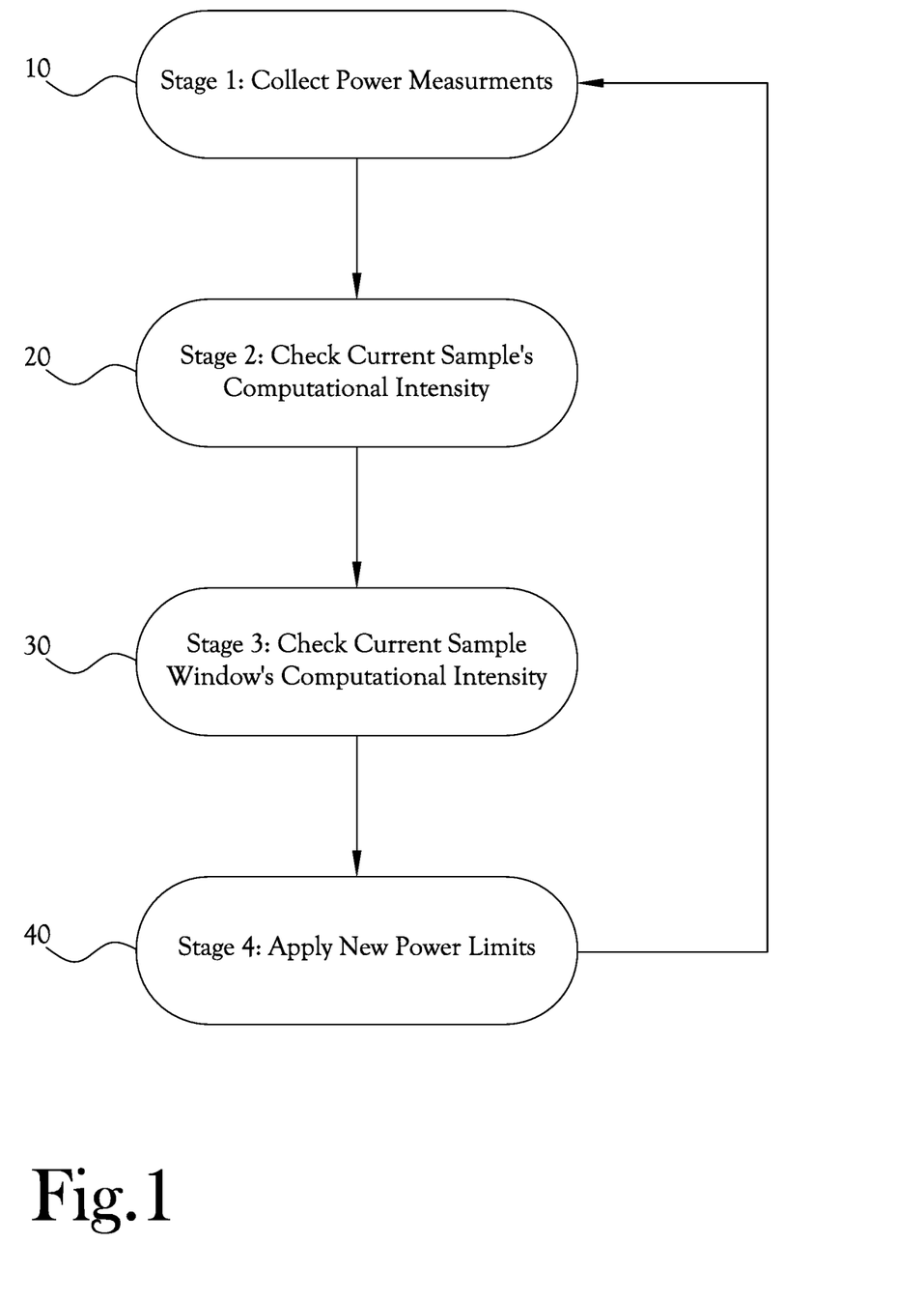
FIG. 1 is a flow chart of the energy optimization process according to an example embodiment of the present general inventive concept.

FIG. 1 represents a top level view of Concept A, which is a first embodiment of the energy efficient computer system. In Stage 1, power measurements for the computer system may be collected 10. A thread samples energy/power measurements for a given hardware component at a regular time interval. These measurements are then stored for later analysis. In Stage 2, the current samples computational intensity may be checked 20. A metric based on current power consumption and current power limits for a given system hardware component is computed. The current sample metric is checked against a metric threshold and the sample type is marked based on this analysis. The sample types can be classified as either memory-bound or compute-bound. The metric can be precomputed or derived during run time. In Stage 3, the current sample window's computational intensity may be checked 30. A check is performed to determine if the number of a given type of computational intensity exceeds the maximum allowed in a sample window for that given type. If the number exceeds the maximum quantity for memory-bound code, then the optimal limit for memory-bound codes is determined, based on the metric from Stage 2. If the number exceeds the maximum for compute-bound code, then the optimal limit for compute-bound code is determined, based on the metric from Stage 2. The sample window can be precomputed or derived at run time. Finally, in Stage 4, a new power limit is applied by enforcing the new power limit for the given hardware components in a system 40. Control is then returned to Stage 1, collecting power measurements 10.

Figure 2:
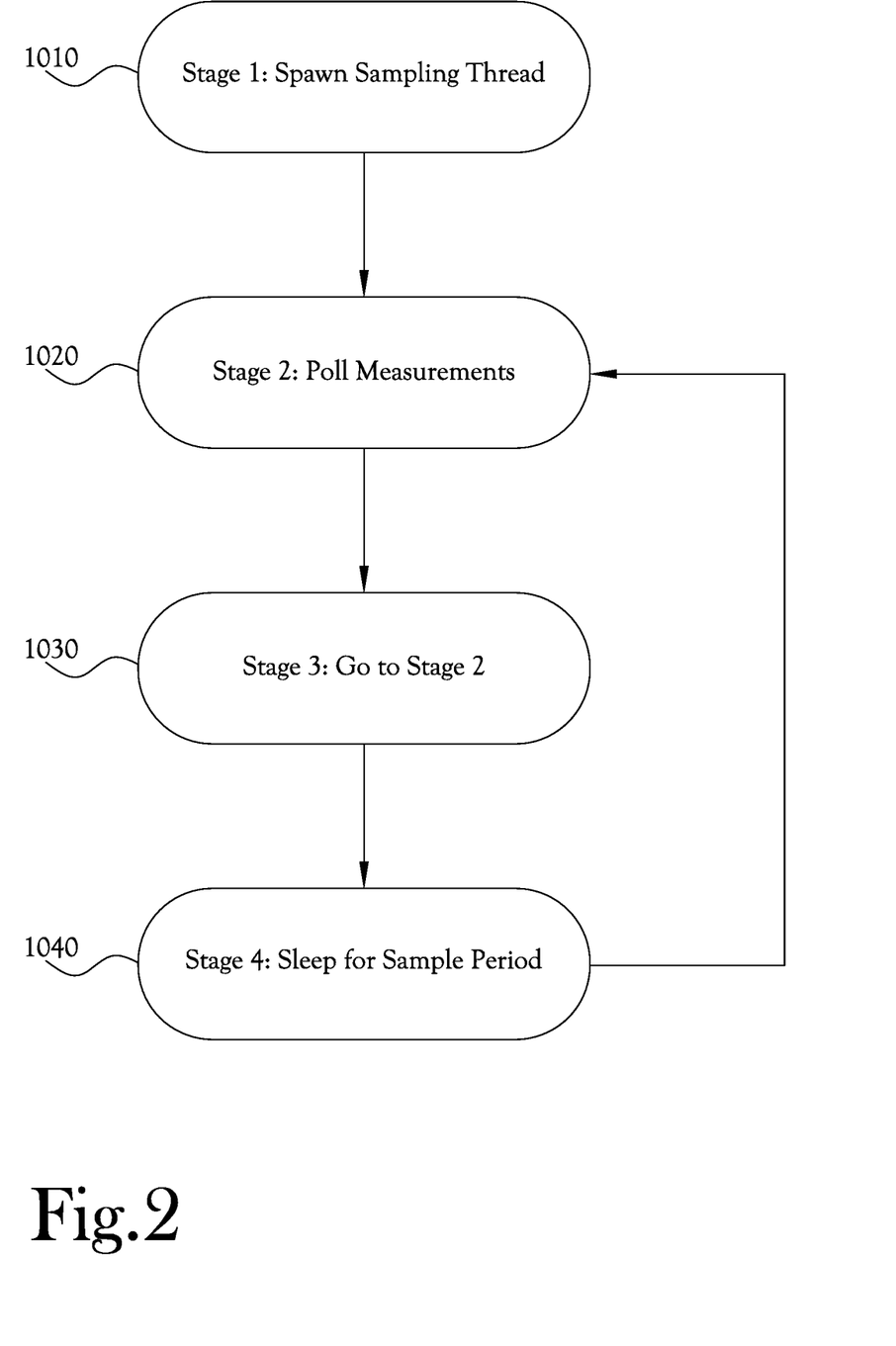
FIG. 2 is a flow chart of the energy optimization process according to an example embodiment of the present general inventive concept.

FIG. 2 represents Stage 1 of FIG. 1, where power measurements are collected 10. In Step 1 of Stage 1 a sampling thread is spawned 1010. A thread is created for sampling power measurements, where measurements are taken from specific system files. In Step 2 of Stage 1, poll measurements are taken 1020. Specific system files are polled and power measurements are collected. Measurements at each time step may then be stored for analysis. In Step 3 of Stage 1, the flow continues to Stage 2, Step 1 of Concept A, where an efficiency metric is calculated 2010 (see description for FIG. 3 below). At that point, in Step 4 of Stage 1, the process sleeps for a sample period which can be predefined or dynamically derived 1040. Next, after the system returns from sleep mode 1040, the process is returned to Stage 1, Step 2, where poll measurements are taken 1020.

Figure 3:
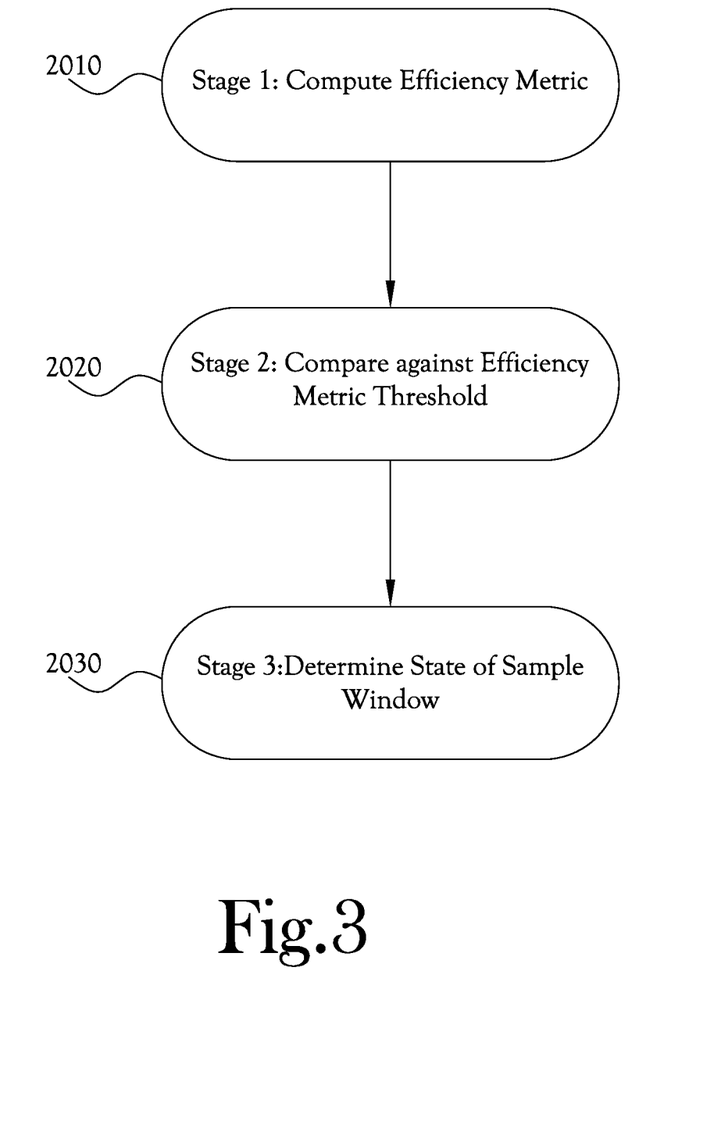
FIG. 3 is a flow chart of the energy optimization process according to an example embodiment of the present general inventive concept.

FIG. 3 represents Stage 2 of FIG. 1, where the current sample's computational intensity is checked 20. In Step 1 of Stage 2 an efficiency metric is created 2010. The metric is computed based on current power consumption and a current power limit. In Step 2 of Stage 2, the efficiency metric is compared against an efficiency metric threshold 2020. The current efficiency metric is checked to determine if it is memory-bound or compute-bound. If it is determined to be memory-bound, the current sample is flagged as memory-bound. If compute-bound, the current sample is flagged as compute-bound. In Step 3 of Stage 2, the state of the sample window is determined 2030. A determination is made whether the number of a given type exceeds the number of allowed occurrences in a sample window. If it exceeds the allowed number, then control goes to Stage 3, Step 1, to determine a new limit 3010. If it doesn't exceed the amount, then control goes back to Stage 1, Step 2, to poll for more measurements 1020.

Figure 4:
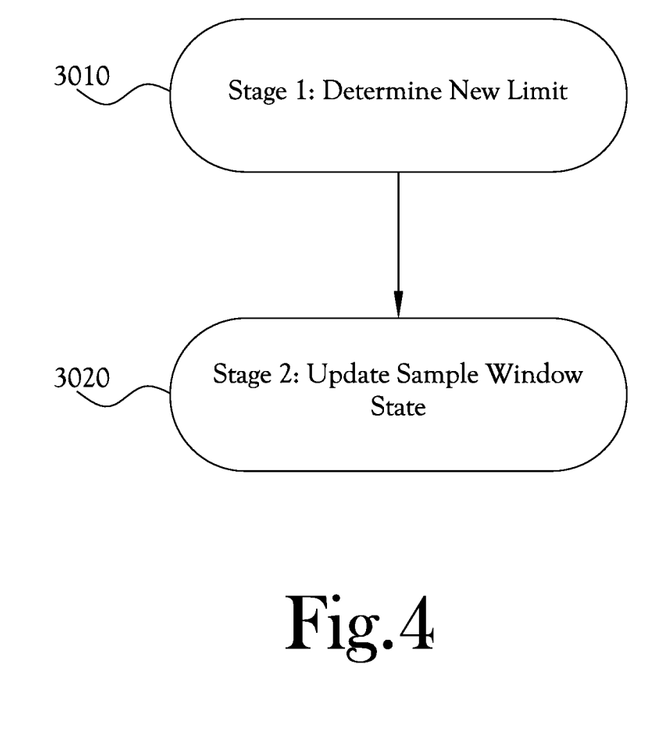
FIG. 4 is a flow chart of the energy optimization process according to an example embodiment of the present general inventive concept.

FIG. 4 represents Stage 3 of FIG. 1, where the current sample window's computational intensity is checked 30. In Step 1 of Stage 3 new power limits for the hardware components are determined 3010. The process checks the sample window state. If the sample indicates a memory-bound state, then the process finds an optimal power limit for memory-bound codes based on current power consumption and limit. If the sample indicates a compute-bound state, then the process finds an optimal power limit for compute-bound codes based on current power consumption and limit. In Step 2 of Stage 3, the sample window state is updated 3020. The process updates the sample window state to indicate the type of the current sample. This state is used for subsequent samples to determine a sample window history. The new limit is then sent to Stage 4, Step 1, where the new power limits calculated herein are applied to the hardware components 4010.

Figure 5:
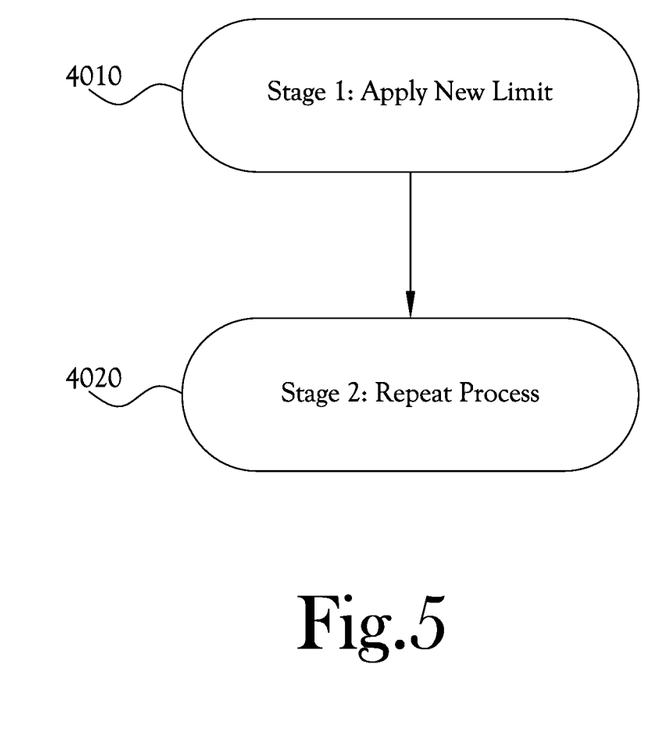
FIG. 5 is a flow chart of the energy optimization process according to an example embodiment of the present general inventive concept.

FIG. 5 represents Stage 4 of FIG. 1, applying the new power limits 40. In Step 1 of Stage 4 new power limits are applied to the hardware components 4010. The process applies the new limit based on a computational intensity type, which is determined in Stage 3. The process then stores the new limit for further analysis. In Step 2 of Stage 4, the process is repeated 4020. Sleep is put into effect for the sample interval, since one sample has now been processed. Control is then returned to Stage 1 Step 4 to process the next sample.

Figure 6:
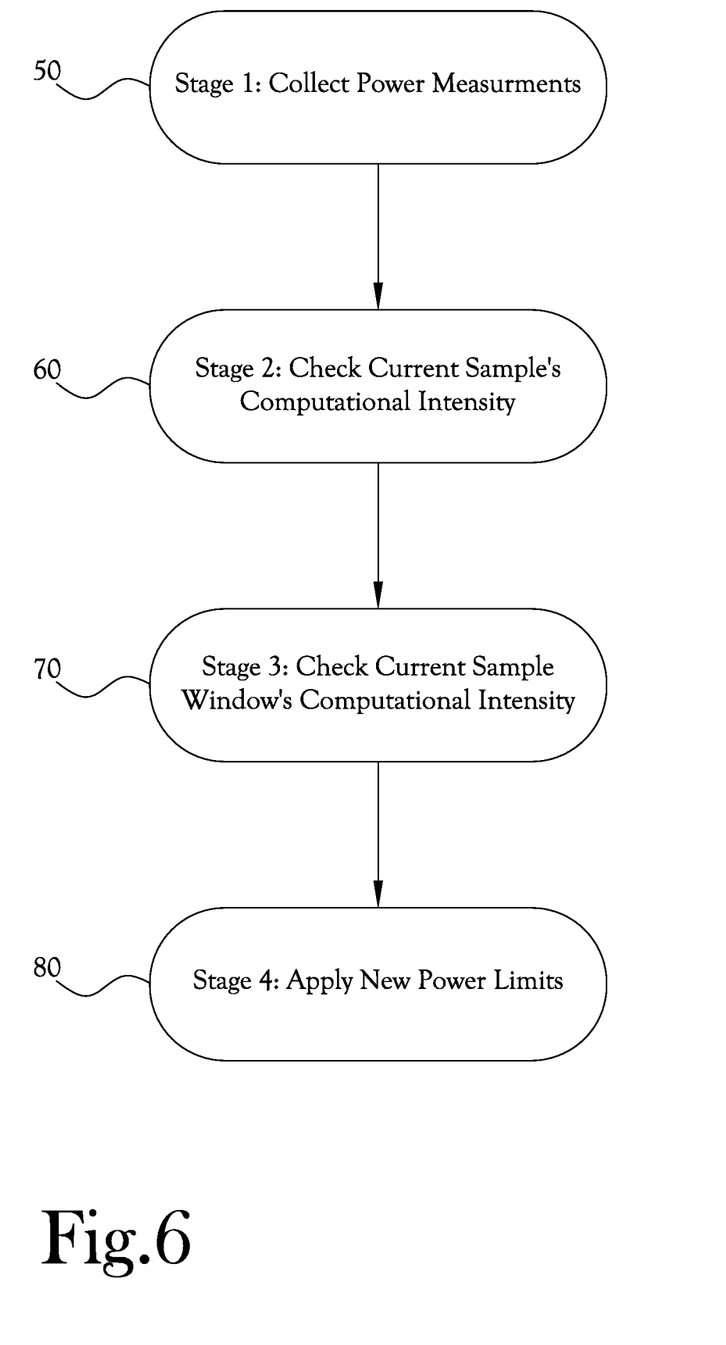
FIG. 6 is a flow chart of the energy optimization process according to an example embodiment of the present general inventive concept.

FIG. 6 represents a top level view of Concept B, a second embodiment of the energy efficient computer system. In Stage 1, power measurements for the computer system may be collected 50. A thread samples energy/power measurements, and counters for a given hardware component at a regular time interval. These measurements are then stored for later analysis. In Stage 2, the current samples computational intensity may be checked 60. A metric based on current power consumption, current power limits, and hardware counters for a given system hardware component is computed. The current sample metric is checked against a metric threshold and the sample type is marked based on this analysis. The sample types can be classified as either memory-bound or compute-bound. The metric can be pre-computed or derived during run time. In Stage 3, the current sample window's computational intensity may be checked 70. A check is performed to determine if the number of a given type of computational intensity exceeds the maximum allowed in a sample window for that given type. If the number exceeds the maximum quantity for memory-bound code, then the optimal limit for memory-bound codes is determined, based on the metric from Stage 2. If the number exceeds the maximum for compute-bound code, then the optimal limit for compute-bound code is determined, based on the metric from Stage 2. The sample window can be precomputed or derived at run time. Finally, in Stage 4, a new power limit is applied by enforcing the new power limit for the given hardware components in a system 80.

Figure 7:
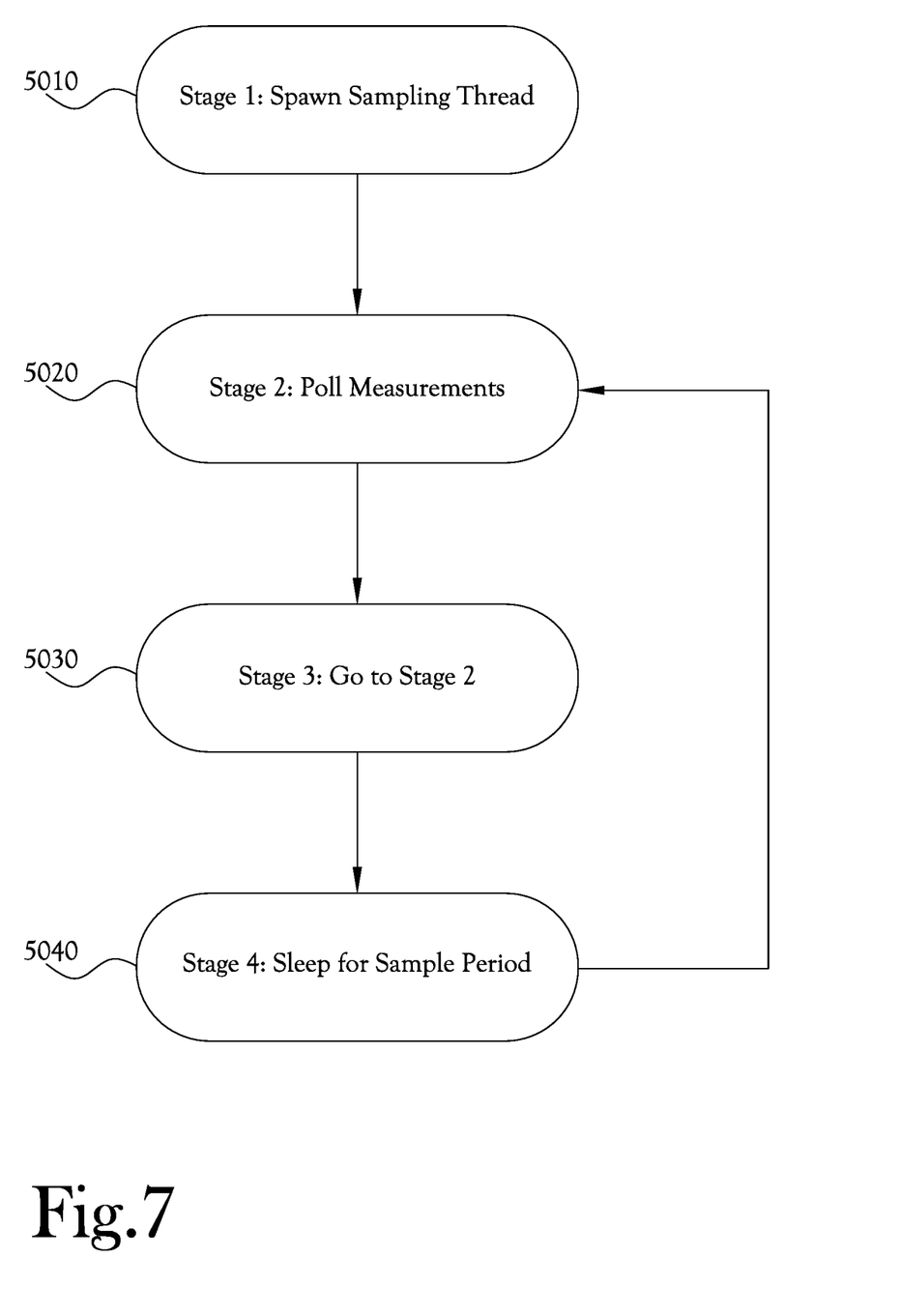
FIG. 7 is a flow chart of the energy optimization process according to an example embodiment of the present general inventive concept.

FIG. 7 represents Stage 1 of FIG. 6, where power measurements are collected 50. In Step 1 of Stage 1 a sampling thread is spawned 5010. A thread is created for sampling power measurements as well as hardware counters, where measurements are taken from specific system files. In Step 2 of Stage 1, poll measurements are taken 5020. Specific system files are polled, and power measurements and hardware counters are collected. Measurements at each time step may then be stored for analysis. In Step 3 of Stage 1, the flow continues to Stage 2, Step 1 of Concept B, where an efficiency metric is calculated 6010 (see description for FIG. 8 below). At that point, in Step 4 of Stage 1, the process sleeps for a sample period which can be predefined or dynamically derived 5040. Next, after the system returns from sleep mode 5040, the process is returned to Stage 1, Step 2, where poll measurements are taken 5020.

Figure 8:
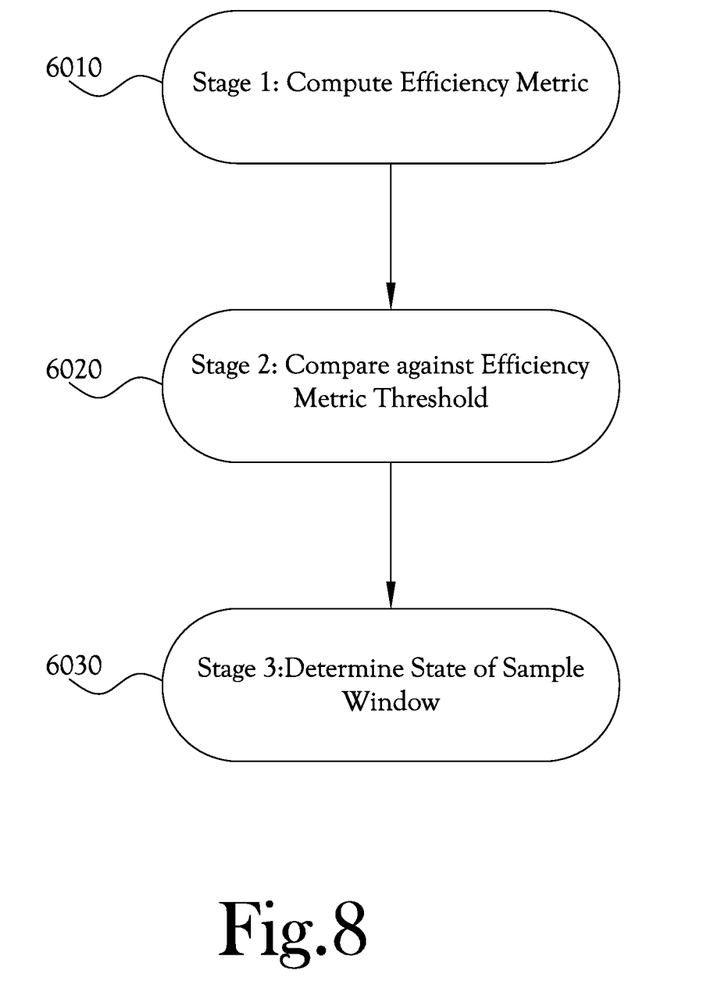
FIG. 8 is a flow chart of the energy optimization process according to an example embodiment of the present general inventive concept.

FIG. 8 represents Stage 2 of FIG. 6, where the current sample's computational intensity is checked 60. In Step 1 of Stage 2 an efficiency metric is created 6010. The metric is computed based on current power consumption, a current power limit, and current hardware counter values. In Step 2 of Stage 2, the efficiency metric is compared against an efficiency metric threshold 6020. The current efficiency metric is checked to determine if it is memory-bound or compute-bound. If it is determined to be memory-bound, the current sample is flagged as memory-bound. If compute-bound, the current sample is flagged as compute-bound. In Step 3 of Stage 2, the state of the sample window is determined 6030. A determination is made whether the number of a given type exceeds the number of allowed occurrences in a sample window. If it exceeds the allowed number, then control goes to Stage 3, Step 1, to determine a new limit 7010. If it doesn't exceed the amount, then control goes back to Stage 1, Step 2, to poll for more measurements 5020.

Figure 9:
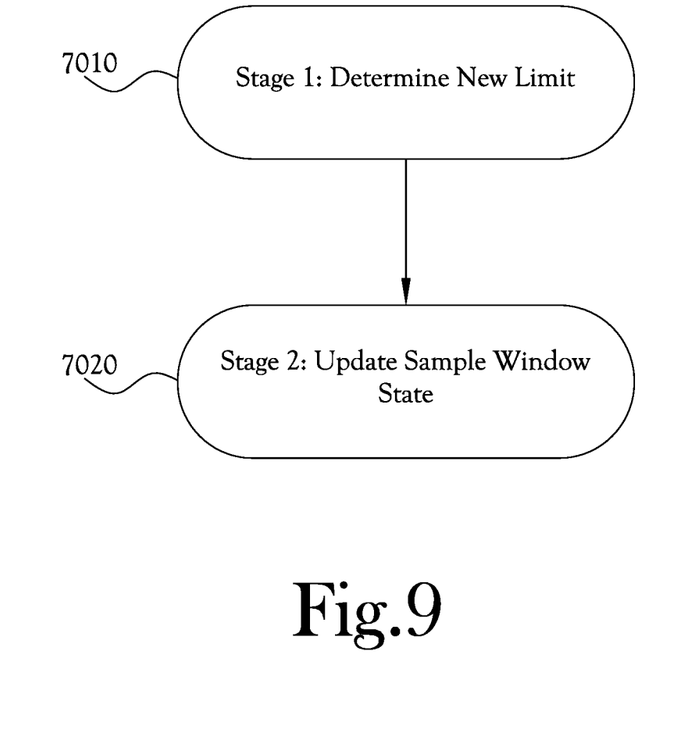
FIG. 9 is a flow chart of the energy optimization process according to an example embodiment of the present general inventive concept.

FIG. 9 represents Stage 3 of FIG. 6, where the current sample window's computational intensity is checked 70. In Step 1 of Stage 3 new power limits for the hardware components are determined 7010. The process checks the sample window state. If the sample indicates a memory-bound state, then the process finds an optimal power limit for memory-bound codes based on current power consumption, power limit, and hardware counters. If the sample indicates a compute-bound state, then the process finds an optimal power limit for compute-bound codes based on current power consumption, power limit, and hardware counters. In Step 2 of Stage 3, the sample window state is updated 7020. The process updates the sample window state to indicate the type of the current sample. This state is used for subsequent samples to determine a sample window history. The new limit is then sent to Stage 4, Step 1, where the new power limits calculated herein are applied to the hardware components 8010.

Figure 10:
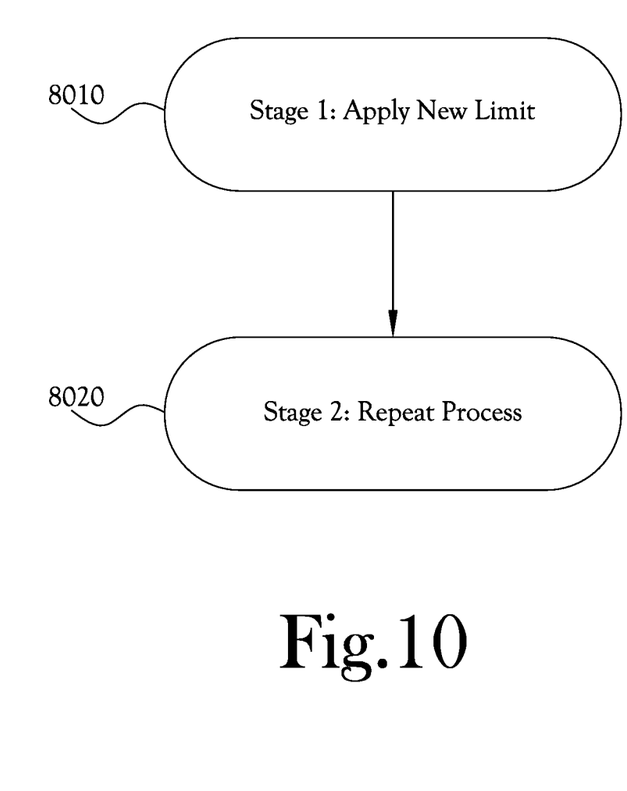
FIG. 10 is a flow chart of the energy optimization process according to an example embodiment of the present general inventive concept.

FIG. 10 represents Stage 4 of FIG. 6, applying the new power limits 80. In Step 1 of Stage 4 new power limits are applied to the hardware components 8010. The process applies the new limit based on a computational intensity type, which is determined in Stage 3. The process then stores the new limit for further analysis. In Step 2 of Stage 4, the process is repeated 8020. Sleep is put into effect for the sample interval, since one sample has now been processed. Control is then returned to Stage 1 Step 4 to process the next sample.

Figure 11:
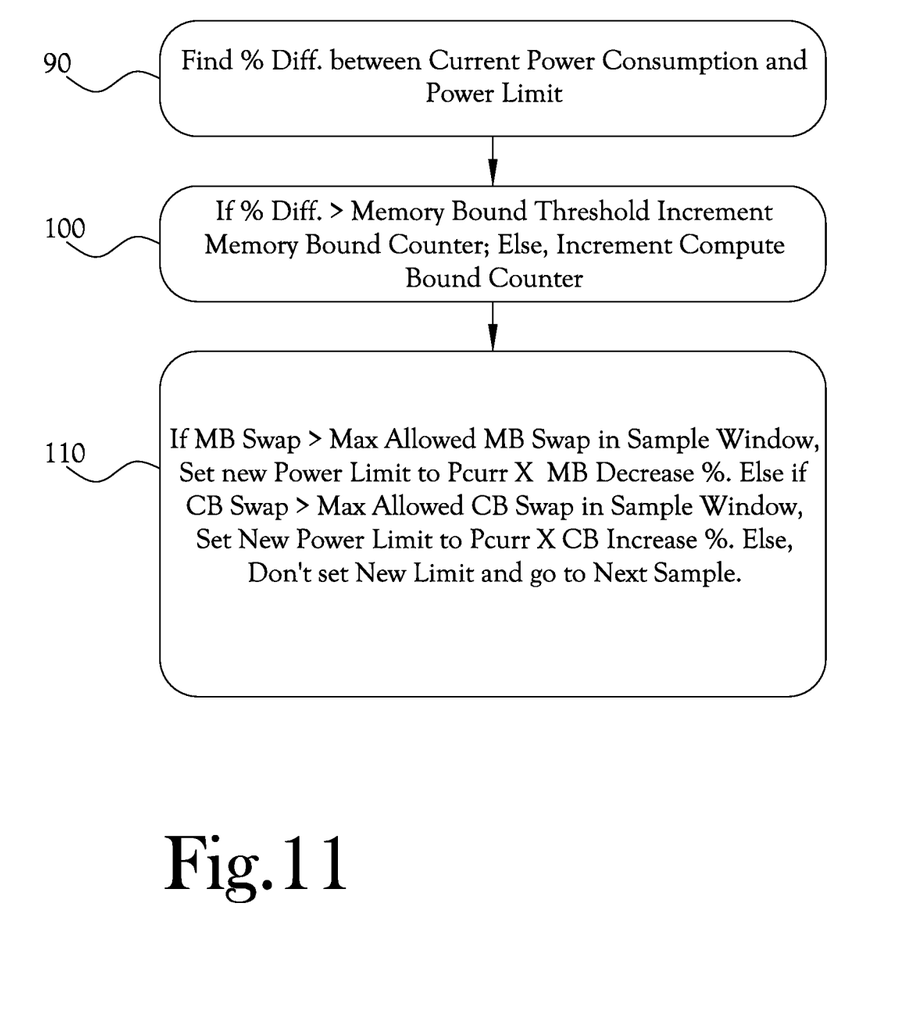
FIG. 11 is a flow chart of the energy optimization process according to an example embodiment of the present general inventive concept.

FIG. 11 represents a more detailed breakdown of Stage 3, Concept A. The process calculates a percentage difference between current power consumption and a current power limit 90. It the percentage difference is greater than a memory bound threshold, a memory bound sample count is incremented. Otherwise, a compute bound sample count is incremented 100. If the memory bound sample count exceeds a maximum allowed memory bound sample count in a sample window, a new power limit is set to the current power limit multiplied by the memory bound decrease percentage. Otherwise, if the compute bound sample count exceeds a maximum allowed compute bound sample count in a sample window, a new power limit is set to the current power limit multiplied by the compute bound increase percentage. If neither the memory bound sample count nor the compute bound sample count exceeds the maximum allowed amounts, then don't set a new limit and continue to the next sample 110.

Figure 12:
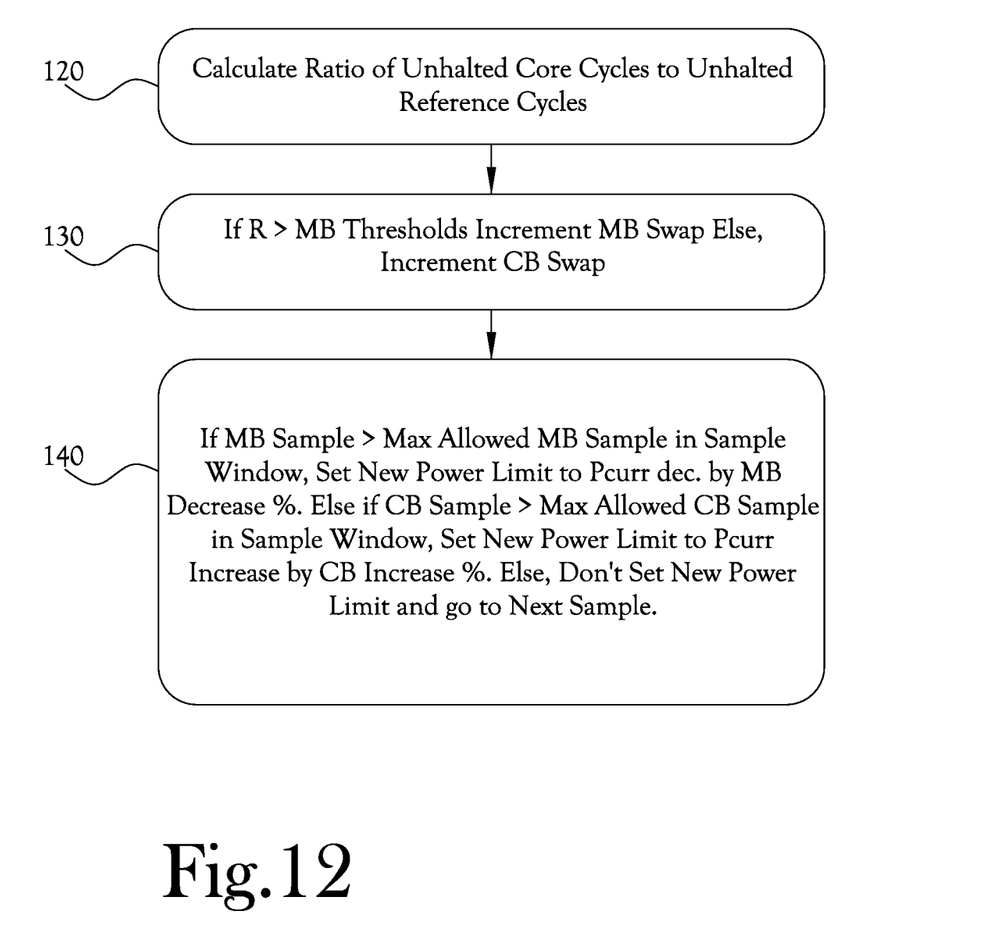
FIG. 12 is a flow chart of the energy optimization process according to an example embodiment of the present general inventive concept.

FIG. 12 represents a more detailed breakdown of Stage 3, Concept B. The process calculates a ratio of unhalted core cycles to unhalted reference cycles 120. If the ratio is greater than a memory bound threshold, increment memory bound sample count. Otherwise, increment a compute bound sample count 130. If the memory bound sample count exceeds a maximum allowed memory bound sample count in a sample window, set a new power limit decremented by the memory bound decrease amount. Otherwise, if the compute bound count exceeds a maximum allowed compute bound sample count in a sample window, set a new power limit to the current power limit incremented by the compute bound increase amount. If neither the memory bound sample count nor the compute bound count exceeds the maximum allowed amounts, don't set a new limit and continue to the next sample 140.

While various aspects of the invention are described in the paragraphs above, it will be apparent to those of ordinary skill in the art that other embodiments and implementations are possible within the scope of the invention. Accordingly, the invention is not to be restricted except in light of the attached claims and their equivalents.

Having thus described the aforementioned invention, what is claimed is:

1. A method for optimizing energy utilization of a computer processing device, the method comprising:
sampling power measurements for given hardware components at a regular interval;
storing the power measurements for later analysis;
computing metrics for a sample window based on current power consumption and current power limits for given system hardware components;
comparing current sample metrics against a metric threshold;
classifying a current sample based on the comparison of the current sample metrics against a metric threshold;

assigning a classification type based on classifying a current sample window;

determining if an actual number of a computational intensity characteristic exceeds a maximum allowed reference number in a sample window for the classification type;

if the actual number of a computational intensity characteristic exceeds the maximum for the classification type, computing a new maximum allowed for the classification type; and constraining the hardware components to new maximum energy and power measurements.

2. The method according to claim 1, wherein the computational intensity characteristic comprises a number of either compute bound samples or memory bound samples within the sample window.

3. The method according to claim 2, wherein the hardware components comprise memory modules and processor modules.

4. The method according to claim 3, wherein a commercially-available software interface is utilized to sample the power measurements for the given hardware components.

5. The method according to claim 3, wherein a commercially-available software interface is utilized to constrain the hardware components to new maximum power measurements.

6. The method according to claim 1, wherein the sample window is derived at run time.

7. The method according to claim 1, wherein the sample window is precomputed.

8. A method for optimizing energy utilization of a computer processing device, the method comprising:

sampling power measurements and hardware counters for given hardware components at a regular interval;

storing the power measurements for later analysis;

computing metrics for a sample window based on a current power consumption, current power limits, and hardware counters for given system hardware components;

comparing current sample metrics against a metric threshold;

classifying a current sample based on the comparison of the current sample metrics against a metric threshold;

assigning a classification type based on classifying the current sample;

determining if an actual number of a computational intensity characteristic exceeds a maximum allowed reference number in a sample window for the classification type;

if the actual number of a computational intensity characteristic exceeds the maximum for the classification type, computing a new maximum allowed for the classification type; and constraining the hardware components to new maximum power measurements.

9. The method according to claim 8, wherein the computational intensity characteristic comprises a number of either compute bound samples or memory bound samples within the sample window.

10. The method according to claim 9, wherein the hardware components comprise memory modules and processor modules.

11. The method according to claim 10, wherein a commercially-available software interface is utilized to sample the power measurements for the given hardware components.

12. The method according to claim 10, wherein a commercially-available software interface is utilized to constrain the hardware components to new maximum power measurements.

13. The method according to claim 8, wherein the sample window is derived at run time.

14. The method according to claim 8, wherein the sample window is precomputed.

* * * * *